United States Patent
Stephens

(10) Patent No.: US 6,328,681 B1
(45) Date of Patent: Dec. 11, 2001

(54) ELASTOMERIC ROLL COVER WITH ULTRA HIGH MOLECULAR WEIGHT POLYETHYLENE FILLER

(75) Inventor: John Michael Stephens, deceased, late of Duncan, SC (US), by Nancy Stephens, legal representative

(73) Assignee: Stowe Woodward Inc., Middletown, VA (US)

( * ) Notice: Subject to any disclaimer, the term of this patent is extended or adjusted under 35 U.S.C. 154(b) by 0 days.

(21) Appl. No.: 09/234,734

(22) Filed: Jan. 21, 1999

(51) Int. Cl.⁷ ..................................................... F16C 13/00
(52) U.S. Cl. ......................................................... 492/56
(58) Field of Search ................................. 492/56, 52, 18, 492/20

(56) References Cited

U.S. PATENT DOCUMENTS

| | | | |
|---|---|---|---|
| 3,637,416 | * | 1/1972 | Misch et al. ......................... 428/412 |
| 4,038,731 | * | 8/1977 | Hill ........................................ 492/56 |
| 4,250,605 | * | 2/1981 | Chapman ............................... 492/56 |
| 4,317,265 | * | 3/1982 | Chase et al. ........................... 492/56 |
| 5,541,001 | * | 7/1996 | Vreeland et al. .................. 428/423.1 |
| 5,860,360 | * | 1/1999 | Lane, III et al. ................... 101/376 |
| 5,983,799 | * | 11/1999 | Lane, III et al. ................... 101/375 |
| 5,984,849 | * | 11/1999 | Ohki et al. ............................. 492/56 |

FOREIGN PATENT DOCUMENTS

| | | | |
|---|---|---|---|
| 1 147 133 | 5/1983 | (CA) | ............................. B21K/21/00 |
| WO97/47460 | 12/1997 | (WO) | ............................. B29C/47/24 |
| WO98/56984 | 12/1998 | (WO) | ............................... D21F/3/08 |

* cited by examiner

Primary Examiner—S. Thomas Hughes
Assistant Examiner—Marc Butler
(74) Attorney, Agent, or Firm—Myers Bigel Sibley & Sajovec

(57) ABSTRACT

The industrial roll of the present invention comprises a substantially cylindrical core, an adhesive layer overlying the core, and a cover overlying the adhesive layer. The cover comprises: a polymeric base layer overlying the adhesive layer; and a top stock layer overlying the base layer. The top stock layer comprises a mixture of an elastomeric material and ultra high molecular weight polyethylene (UHMWPE), with the mixture including 100 parts elastomeric material by weight and between about 25 and 50 parts UHMWPE by weight. With these components in the recited ratios, the roll can be formulated to a desired hardness within the desired 10 to 50 P&J hardness range while maintaining release properties suitable for papermaking in the papermaking environment.

25 Claims, 2 Drawing Sheets

ELASTOMERIC ROLL COVER WITH ULTRA HIGH MOLECULAR WEIGHT POLYETHYLENE FILLER

FIELD OF THE INVENTION

The present invention relates generally to industrial roll covers, and more particularly to elastomeric industrial roll covers.

BACKGROUND OF THE INVENTION

Cylindrical rolls are utilized in a number of industrial applications, especially those relating to papermaking. Such rolls are typically employed in demanding environments in which they can be exposed to high dynamic loads and temperatures and aggressive or corrosive chemicals. As an example, in a typical paper mill, rolls are used not only for transporting a fibrous web sheet between processing stations, but also, in the case of pressure and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a metallic core. By varying the polymer or elastomer employed as a cover, the cover designer can provide the roll with different performance characteristics as the papermaking application demands. Also, replacement of a cover over a metallic roll can be less expensive than the replacement of an entire metallic roll.

It is particularly prevelant to employ elastomers in covers for papermaking rolls, such as natural rubber or synthetic elastomers such as neoprene, styrene-butadiene (SBR), nitrile, chlorosulfonated polyethylene (also known under the name hypalon), and EDPM (the name given to an ethylene-propylene terpolymer formed of ethylene-propylene diene monomer). Because elastomers are typically versatile materials, elastomeric covers can be used in a variety of papermaking applications. For example, rubber covers may be used in smoothing press rolls employed in the press section of a papermaking machine, or may also be employed in the dryer section of a papermaking machine in size press rolls (where starch is added to paper stock) and in breaker stack press rolls (in which non-uniformities in the paper are flattened or removed).

Typically, elastomeric covers employed in papermaking machines have the requisite strength, elastic modulus, and resistance to elevated temperature, water and harsh chemicals to withstand the papermaking environment. In addition, rubber covers employed in the aforementioned areas are designed to have a predetermined surface hardness that is appropriate for the process they are to perform, and they typically require that the paper sheet "release" from the cover without damage to the paper sheet. Also, in order to be economical, the cover should be abrasion- and wear-resistant. Designers of covers generally attempt to achieve this balance of properties by using different base rubber compounds and by including different fillers and additives in the compound. However, often the inclusion of a filler or additive to satisfy one desired property can adversely impact another. As an example, the "releasability" of the cover may be negatively affected by the inclusion of a fibrous filler added to increase strength and hardness. As such, designers of roll cover compounds are constantly searching for new compounds to satisfy the myriad of application demands presented by papermakers.

SUMMARY OF THE INVENTION

In view of the foregoing, it is an object of the present invention to provide a roll cover with a desirable balance of strength, hardness, releasability, and abrasion resistance.

It is also an object of the present invention to provide such a roll cover that includes rubber as the predominant elastomer of the cover.

It is another object of the present invention to provide such a roll that has a hardness of between about 5 and 75 on the Pusey and Jones hardness scale (P & J).

These and other objects are satisfied by the present invention, which relates to an industrial roll that has the desired 5 to 75 P&J hardness while maintaining desirable release properties. The industrial roll of the present invention comprises a substantially cylindrical core, an adhesive layer overlying the core, and a cover overlying the adhesive layer. The cover comprises: an elastomeric base layer overlying the adhesive layer; and a top stock layer overlying the base layer. The top stock layer comprises a mixture of an elastomeric material and ultra high molecular weight polyethylene (UHMWPE), with the mixture including 100 parts elastomeric material by weight and between about 25 and 75 parts UHMWPE by weight. With these components in the recited ratios, the roll can be formulated to a desired hardness within the desired 5 to 75 P&J hardness range while maintaining release properties suitable for papermaking in the papermaking environment.

It is particularly preferred that the UHMWPE be present in the top stock layer in a ratio of between about 35 and 45 parts UHMWPE to 100 parts elastomeric material by weight, with a ratio of about 40 parts UHMWPE to 100 parts elastomeric material being most preferred. It is also preferred that the UHMWPE take the form of spheres or beads having a particle size of between about 5 and 120 $\mu$m.

In one embodiment of the present invention, an elastomeric tie-in layer is included to overlie the base layer and underlie the top stock layer. It is preferred that, when such a configuration is employed, the hardness of the base, tie-in and top stock layers sequentially decreases from the inner to the outer layers (i.e., the outer layers are sequentially softer than the inner layers).

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout, and certain layers, thickness, and dimensions of components may be exaggerated in size for clarity.

Figure 1:
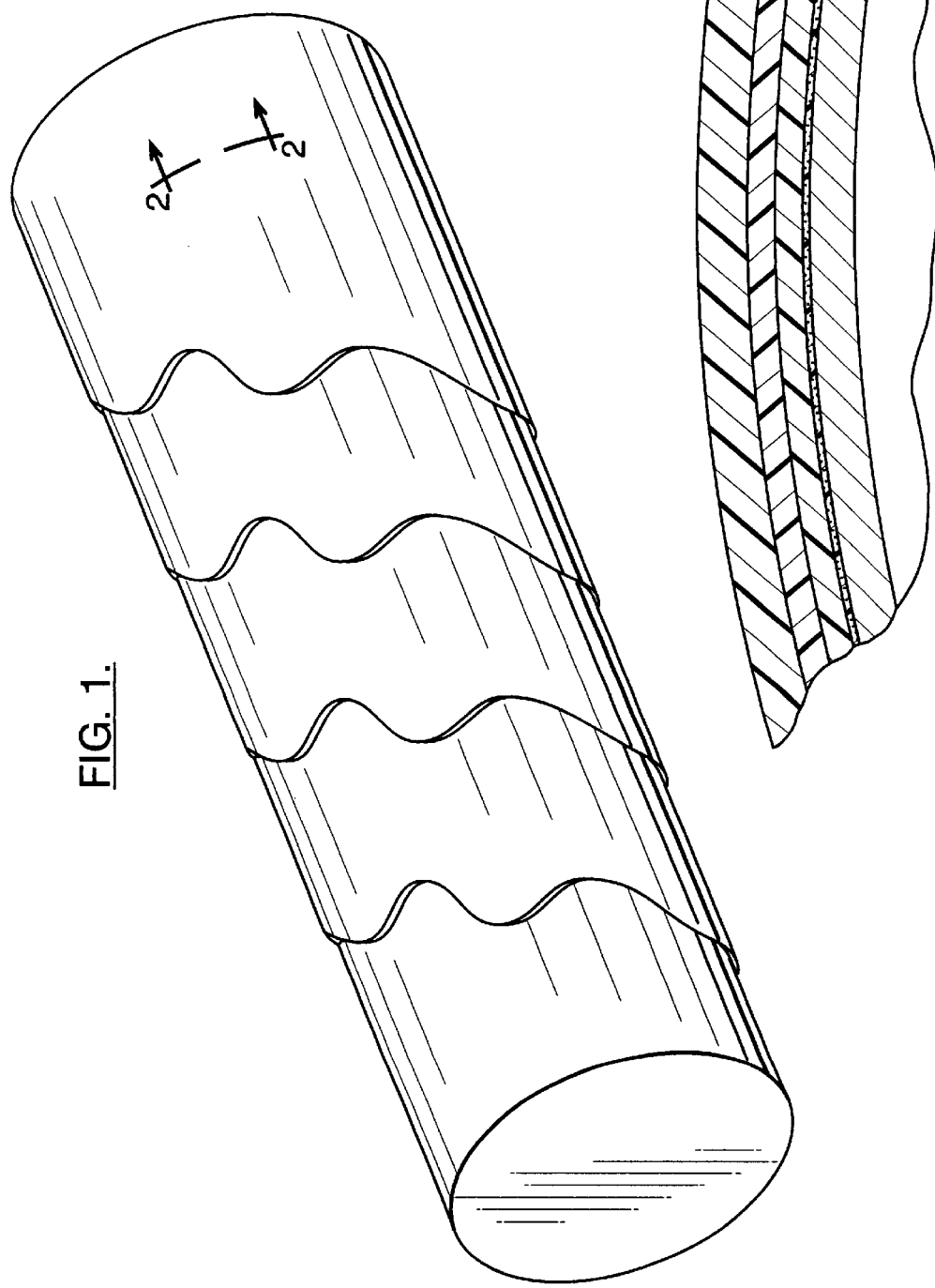
FIG. 1 is a perspective view of a roll of the present invention.
Figure 2:
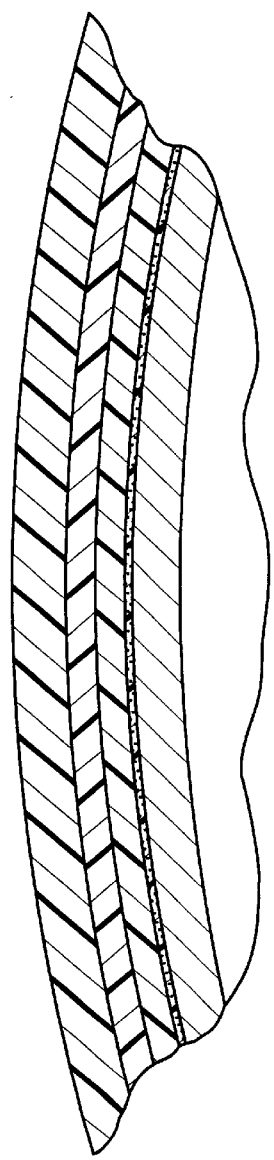
FIG. 2 is a section view of the roll of FIG. 1.

Referring now to the drawings, a papermaking roll, designated broadly at 10, is illustrated in FIGS. 1 and 2. The roll 10 includes in overlying relationship a metallic core 12, an adhesive layer 14, and a cover 16. Each of these components is discussed in greater detail hereinbelow.

The core 12 is a substantially cylindrical, hollow structure typically formed of steel or other metals. The core 12 is typically between about 1.5 and 400 inches in length and 1 and 70 inches in diameter, with lengths between about 100 and 400 inches and diameters of between about 20 and 70 inches being preferred. At these preferred length and diameter ranges, the core 12 typically has walls between about 1 and 5 inches in thickness. Components such as journals and bearings (not shown) are typically included on the core 12 to facilitate its mounting and rotation in a papermaking machine. The surface of the core 12 may be treated by blasting, sanding, sandblasting, or the like to prepare the surface for bonding to the adhesive layer 14.

Referring again to FIGS. 1 and 2, the adhesive layer 14 comprises an adhesive (typically a solvent-based or water-based adhesive) that can attach the core 12 to the cover 16. Of course, the adhesive comprising the adhesive layer 14 should be chosen to be compatible with the materials of the core 12 and the base layer 18 of the cover 16 (i.e., it provides a high-integrity bond between these structures without unduly harming either material); preferably, the bond has a tensile bond strength of between about 1,200 and 5,000 psi. Exemplary solvent-based adhesives included those containing methyl ethyl ketone (for nitrile covers), naphtha (for SBR covers), and toluol (for hypalon covers). The adhesive may have additives, such as curing agents, that facilitate curing and physical properties.

The adhesive layer 14 can be applied to the core 12 in any manner known to be suitable to those skilled in this art for applying a thin layer of material. Exemplary application techniques include spraying, brushing, immersion, scraping, and the like. It is preferred that, if a solvent-based adhesive is used, the adhesive layer 14 be applied such that the solvent can evaporate prior to the application of the cover 16 in order to reduce the occurrence of trapped solvent that can cause "blows" during the curing process.

Still referring to FIGS. 1 and 2, the cover 16 comprises, in overlying relationship, a base layer 18, a tie-in layer 20, and a top stock 22. The base layer 18 is adhered to the adhesive layer 14. The base layer 18 comprises an polymeric compound (preferably an elastomeric compound) that typically includes fillers and other additives. Exemplary elastomeric compounds include natural rubber and synthetic rubbers such as SBR, EPDM, hypalon, nitrile rubber, neoprene, isoprene, silicone, and fluoroelastomers, and blends and co-polymers thereof, including blends with polyvinylchloride (PVC). Another exemplary polymeric material that may be suitable for use in the base layer is epoxy. Additional monomers monomer coagents, such as trimethyl propane trimethacrylate and 1, 3 butylene glycol dimethacrylate, may also be added to enhance polymerization.

Fillers are typically added to the base layer 18 to modify the physical properties of the compound and/or to reduce its cost. Exemplary filler materials include glass, inorganic oxides such as aluminum oxide ($Al_2O_3$), silicon dioxide ($SiO_2$), magnesium oxide (MgO), calcium oxide (CaO), zinc oxide (ZnO) and titanium dioxide ($TiO_2$), carbon black (also known as furnace black), silicates such as clays, talc, wollastonite ($CaSiO_3$), magnesium silicate ($MgSo_3$) anhydrous aluminum silicate, and feldspar ($KAlSi_3O_8$), sulfates such as barium sulfate and calcium sulfate, metallic powders such as aluminum, iron, copper, stainless steel, or nickel, carbonates such as calcium carbonate ($CaCo_3$) and magnesium carbonate ($MgCo_3$), mica, silica (natural, fumed or precipitated), and nitrides and carbides, such as silicon carbide (SiC) and aluminum nitride (AlN). These fillers may be present in virtually any form, such as powder, pellet, fiber, sphere or bead.

Also, the base layer 18 may include other additives, such as polymerization initiators, activators and accelerators, curing agents (also known as vulcanizing agents), plasticizers, heat stabilizers, vulcanizing agents, antioxidants and antiozonants, coupling agents, pigments, and the like, that can facilitate processing and enhance physical properties. These components are generally compounded into the elastomer prior to the time of application of the base layer 18 to the adhesive layer 14.

The physical properties of the base layer 18 preferably fall within the ranges indicated in Table 1.

TABLE 1

| Physical Property | Value |
| --- | --- |
| Young's Modulus (psi) | 10,000–750,000 |
| Tensile Strength (psi) | 3,000–9,000 |
| P & J Hardness* | 0–14 |
| Elongation (%) | 1–5 |

*The P&J hardness rating is measured according to ASTM D531-89

The base layer 18 can be applied by any manner known to those skilled in this art to be suitable for the application of elastomers to an underlying surface. Preferably, the base layer 18 is applied through an extrusion process in which strips of the base layer 18 are extruded through an extrusion die, then, while still warm, are overlaid over the adhesive layer 14 as it is still somewhat tacky. The base layer strips are preferably between about 0.030 and 0.125 inches in thickness and are applied in an overlapping manner, with the result that total thickness of the base layer 18 is typically between about 0.0625 and 0.25 inches.

Like the base layer 18, the tie-in layer 20 comprises an elastomeric compound that preferably includes fillers and other additives. Exemplary elastomeric compounds include natural rubber and synthetic rubbers such as SBR, EPDM, hypalon, nitrile rubber, neoprene, silicone, and fluoroelastomers, and blends and co-polymers thereof, including blends with polyvinylchloride (PVC). The list of fillers and other additives recited hereinabove for the base layer 18 is equally applicable to the tie-in layer 20. The elastomers, fillers and other additives of the tie-in layer 20 should be selected such that they are compatible with both the base layer 18 and the top stock 22. It is preferred that the tie-in layer 20 have physical properties that fall within the ranges set forth in Table 2.

TABLE 2

| Physical Property | Value |
| --- | --- |
| Tensile Strength (psi) | 1,000–7,500 |
| Elongation (%) | 1–100 |
| P&J Hardness | 3–14 |

The tie-in layer 20 can be applied over the base layer 18 in any manner known those skilled in this art to be suitable for the application of a elastomeric layer over an underlying elastomeric surface. Preferably, the tie-in layer 20 is applied in overlying extruded strips in the manner discussed hereinabove for the base layer 18. It is preferred that the tie-in layer 20 be applied as strips between 0.03125 and 0.625 inches in thickness with a slight edge overlap, such that the total thickness of the tie-in layer 20 is between about 0.0625 and 0.125 inches.

The top stock 22 comprises an elastomer and, optionally, fillers and additives as described hereinabove for the base and tie-in layers 18, 20. The top stock 22 also includes as a filler ultra high molecular weight polyethylene (UHMWPE) in an amount such that between about 25 and 75 parts (preferably between 25 and 50 parts) UHMWPE by weight is added to 100 parts of the elastomer by weight. It has been discovered that the inclusion of UHMWPE in the top stock 22 in the aforementioned ratio can provide a top stock with much improved abrasion resistance without sacrificing desirable release properties.

The elastomer of the top stock 22 can be any elastomeric compound as described hereinabove for the base and tie-in layers 18, 20. Preferably, the elastomer is rubber, and more preferably is SBR, nitrile, EPDM, hypalon, neoprene, or natural rubber. Similarly, the top stock 22 can contain fillers and other additives as described hereinabove for the base and tie-in layers 18, 20.

As discussed hereinabove, the UHMWPE is preferably present in the top stock 22 such that between 25 and 50 parts of UHMWPE are present by weight in the top stock 22 for each 100 parts of elastomer. More preferably, the UHMWPE is present in between about 35 and 45 parts per 100 parts of elastomer; most preferably, this ratio is about 40 parts UHMWPE per hundred parts of elastomer. The UHMWPE of the top stock 22 has a molecular weight of between about 2.0 and $10.0 \times 10^6$ g/mol, and preferably has a molecular weight of between about 3.2 and $8.0 \times 10^6$ g/mol. At this molecular weight, the UHMWPE has a high melt viscosity. The UHMWPE can be present in any form known to those skilled in this art for fillers, such as powder, pellet, fiber, sphere or bead, and is preferably present in the form of spheres. Particle sizes of the UHMWPE can range from as low as 5 $\mu$m to as great as 120 $\mu$m or greater, with particle sizes of between about 20 and 120 $\mu$m being preferred. It is preferred that the elastomer, fillers and additives form a material that has physical properties that fall within the ranges set forth in Table 3.

TABLE 3

| Physical Property | Value |
|---|---|
| Hardness (P&J) | |
| cured at 306° F. for 90 minutes | 5–100 |
| cured at 306° F. for 180 minutes | 5–90 |
| cured at 306° F. for 360 minutes | 5–75 |
| Hardness (P&J) | |
| measured at room temperature | 5–75 |
| measured at 100° F. | 7–82 |
| measured at 150° F. | 9–86 |
| DIN abrasion (loss mm$^3$) | 50–200 |
| % weight change in boiling H$_2$O (7 days) | 1.5–20.0 |
| Tensile Strength (psi) | 600–4,000 |
| Rubber Modulus (psi at 50% elongation) | 300–2,000 |
| Tensile Elongation (%) | 50–400 |

Of these physical properties, hardness can be particularly important, as in any given roll application, it is often the hardness of the roll that initially determines whether a roll is appropriate for that application. The inclusion of UHMWPE in a top stock formulation may increase the hardness of that formulation such that, for a given hardness level, the proportions of other ingredients should be varied accordingly. Those skilled in this art will recognize that the hardness of the top stock 22 can be varied by the addition or omission in various quantities of fillers, hardening agents, plasticizers, polymerization accelerators, curing agents, and the like. For example, the hardness of a hypalon-based top stock may be increased by the inclusion of a trimethylolpropane trimethacrylate monomer. Other variations will be known to those skilled in this art and need not be described in detail herein.

The top stock 22 can be applied over the tie-in layer 20 by any technique known to those skilled in this art to be suitable for the application of elastomeric materials over a surface. Preferably, the top stock 22 is applied through an extrusion process such as that described hereinabove for the base layer 18; however, an "angled pass" technique is employed such that strips of extruded material are applied adjacent to each other with sufficient overlap that each strip defines an angle relative to the longitudinal axis of the roll 10 (typically between about 5 and 35 degrees). As a result, the thickness of the top stock 22 is significantly higher than that of the strips themselves. For example, if strips 0.125 inches in thickness are employed, and are applied at an angle of 35 degrees with respect to the longitudinal axis of the roll 10, the resulting thickness of the top stock 22 is approximately 1.5 inches. Preferably, the top stock 22 is applied such that is between about 0.25 and 3.0 inches in thickness (at higher thickness, multiple passes of material may be required). It is also preferred that the thickness of the top stock 22 be between about 40 and 95 percent of the total cover thickness (i.e., the total thickness of the combined base, tie-in and top stock layers 18, 20, 22). Alternatively, any or all of the base, tie-in and top stock layers 18, 20, 22 can be applied through the overlaying of calendered sheets of material.

The elastomeric compounds of the base layer 18, the tie-in layer 20, and the top stock 22 should be selected such that the base layer 18 has a higher hardness value than the tie-in layer 20, and so that the tie-in layer 20 has a higher hardness value than the top stock layer 22. As an example, the base layer 18 may have a hardness of between about 0 and 14, the tie-in layer 20 may have a hardness of between about 3 and 14, and the top stock may have a hardness of between about 5 and 75. The graduated modulus concept reduces the bond line shear stresses that can occur due to mismatches of the elastic properties (such as elastic modulus and Poisson's ratio) of the various layers in the cover constructions. This reduction in interface shear stress can be important in maintaining cover integrity.

Those skilled in this art will also appreciate that the roll 10 may be constructed without a tie-in layer 20; thus, the base layer 18 would directly underlie the top stock layer 22.

After the top stock 22 has been applied, the roll 10 is then cured, typically in an autoclave, for a suitable curing period (generally between about 20 and 40 hours). After curing, it is preferred that any crust that has developed is skimmed from the surface of the top stock 22, and that the top stock 22 is ground for dimensional correctness.

The invention will now be described in greater detail in the following non-limiting examples.

EXAMPLE 1

A top stock formulation was prepared of the ingredients listed in Table 4.

TABLE 4

| Ingredient | Parts (by weight) |
| --- | --- |
| hypalon rubber | 100 |
| fluoroelastomer release agent | 25 |
| trimethylolpropane trimethacrylate monomer | 38.38 |
| *paraffin | 6 |
| *dioctyl phthalate | 2 |
| *furnace black filler | 40 |
| *UHMWPE | 40 |
| *nickel-dibutyldithio carbonate/aromatic oil heat stabilizer | 1 |
| *anhydrous aluminum silicate filler | 20 |
| *DPTT/dioctyl phthalate accelerator | 3 |
| *magnesium oxide vulcanizing agent | 5 |
| *polyethylene | 2 |
| *n-paraffin | 3 |

*Premix ingredients

These ingredients were combined in an open mill mixing procedure. The open mill mixer comprises two cylindrical rolls, one of which rotates more rapidly than the other. Polymer added to the mixer is sheared through to the rotation of the rolls, thereby causing the polymer to become coated on the slower moving roll.

The hypalon and release agent were added to the mill and allowed to form a smooth band. The monomer, paraffin and plasicizer were added to the dry powders and premixed. These premix ingredients (designated in Table 4) were then added to the mixer. This process was carried out for a period of thirty to sixty minutes. After the mixing process, the hypalon formula was ready for application as a cover to a base layer or tie-in layer.

This formulation exhibited a hardness of 10 P&J in hardness testing on a cured, finished roll cover.

EXAMPLE 2

A top stock formulation was prepared of the ingredients listed in Table 5.

TABLE 5

| Ingredient | Parts (by weight) |
| --- | --- |
| hypalon rubber | 100 |
| fluoroelastomer release agent | 25 |
| *paraffin | 30 |
| *dioctyl phthalate | 10 |
| *furnace black filler | 40 |
| *UHMWPE | 40 |
| *nickel-dibutyldithio carbonate/aromatic oil heat stabilizer | 1 |
| *anhydrous aluminum silicate filler | 20 |
| *DPTT/dioctyl phthalate accelerator | 3 |
| *magnesium oxide vulcanizing agent | 5 |
| *polyethylene | 2 |
| *n-paraffin | 3 |

*Premix ingredients

This formulation was mixed on an open mill mixer in the same manner as the top stock formulation of Example 1, with the premix ingredients being blended separately and added to the other ingredients in the open mill mixer.

The formulation was cured and subjected to hardness testing. The formulation exhibited a hardness of 45 P&J on a cured, finished roll cover.

EXAMPLE 3

A top stock formulation was prepared of the ingredients listed in Table 6.

TABLE 6

| Ingredient | Parts (by Weight) |
| --- | --- |
| Nitrile Rubber | 70 |
| zinc methacrylate polymer | 30 |
| *1,3 butylene glycol dimethacrylate | 10.83 |
| *N-octyl, N-decyl trimellitate | 5 |
| *phenol-formaldehyde plasticizer | 5 |
| *hydrated silica reinforcement | 16.67 |
| *titanium dioxide filler | 5 |
| *butylphenol/acetylene tackifyer | 1.5 |
| *octylated diphenylamines antioxidant | 1 |
| *zinc salt of 2-mercapto-4(5)-methylbenzimidazole antioxidant | 1 |
| *stearic acid activator | 1 |
| *Sulfur vulcanizing agent | 0.3 |
| *dicumyl peroxide vulcanizing agent | 6 |
| *zinc oxide activator | 8 |
| *UHMWPE | 40 |
| *vinyl-tris (2-methoxyethoxy) silane coupling agent | 2 |
| azo red pigment | 2.5 |
| *ferric oxide pigment | 3 |

*Premix ingredients

This formulation was mixed on an open mill mixer in the same manner as the top stock formulation of Example 1, with the premix ingredients being blended separately and added to the other ingredients in the open mill mixer.

The formulation was cured and subjected to physical property tests. The formulation exhibited the physical properties listed in Table 7.

TABLE 7

| Physical Property | Value |
| --- | --- |
| Hardness (P&J) | |
| cured at 306° F. for 90 minutes | $20^1/29^2$ |
| cured at 306° F. for 180 minutes | 21/32 |
| cured at 306° F. for 360 minutes | 22/30 |
| Hardness (Shore A) | |
| cured at 306° F. at 90 degrees | 88 |
| cured at 306° F. at 180 degrees | 88 |
| cured at 306° F. at 360 degrees | 88 |
| Hardness (P&J) | |
| measured at room temperature | $26^1/33^2$ |
| measured at 100 degrees F. | 28/35 |
| measured at 125 degrees F. | 30/40 |
| measured at 150 degrees F. | 33/43 |
| measured at 175 degrees F. | 36/46 |
| measured at 200 degrees F. | 44/51 |
| measured at 225 degrees F. | 44/51 |
| measured at 250 degrees F. | 50/61 |
| DIN abrasion (loss mm$^3$) | 62.3969 |
| % weight change in boiling H$_2$O (after 7 days) | 1.60 |
| Tensile Strength (psi) | 2652 |
| Tensile Elongation (%) | 236 |

$^1$measured immediately after impact
$^2$measured one minute after impact

EXAMPLE 4

A top stock formulation was prepared of the ingredient listed in Table 8.

TABLE 8

| Ingredient | Parts (by weight) |
| --- | --- |
| Nitrile Rubber | 70 |
| zinc methacrylate polymer | 30 |
| *1,3 butylene glycol dimethacrylate | 5 |

TABLE 8-continued

| Ingredient | Parts (by weight) |
| --- | --- |
| *N-octyl, N-decyl trimellitate | 15 |
| *phenol-formaldehyde plasticizer | 5 |
| *hydrated silica reinforcement | 10 |
| *titanium dioxide filler | 5 |
| *butylphenol/acetylene tackifyer | 1.5 |
| *octylated diphenylamines antioxidant | 1 |
| *zinc salt of 2-mercapto-4(5)-methylbenzimidazole antioxidant | 1 |
| *stearic acid activator | 1 |
| *Sulfur vulcanizing agent | 0.3 |
| *dicumyl peroxide vulcanizing agent | 6 |
| *zinc oxide activator | 8 |
| *UHMWPE | 40 |
| *vinyl-tris (2-methoxyethoxy) silane coupling agent | 2 |
| azo red pigment | 2.5 |
| *ferric oxide pigment | 3 |

*Premix ingredients

This formulation was mixed on an open mill mixer in the same manner as the top stock formulation of Example 1, with the premix ingredients being blended separately and added to the other ingredients in the open mill mixer.

After curing, the top stock formulation was tested under P&J hardness testing conditions and found to have a P&J hardness of 40 on a cured, finished roll.

EXAMPLE 5

A top stock formulation was prepared of the ingredient listed in Table 9.

TABLE 9

| Ingredient | Parts (by weight) |
| --- | --- |
| Nitrile Rubber | 70 |
| zinc methacrylate polymer | 30 |
| *1,3 butylene glycol dimethacrylate | 4.58 |
| *phenol-formaldehyde plasticizer | 7.5 |
| *hydrated Silica reinforcement | 25 |
| *butylphenol/acetylene tackifyer | 2 |
| *octylated diphenylamines antioxidant | 1 |
| *zinc salt of z-mercapto-4(5)-methylbenimidazole antioxidant | 1 |
| *stearic acid activator | 1 |
| *sulfur vulcanizing agent | 0.30 |
| *dicumyl peroxide vulcanizing agent | 7 |
| *zinc oxide activator | 8 |
| *conductive furnace carbon black | 5 |
| *UHMWPE | 40 |
| *Vinyl-tris(2-methoxyethoxy) silane coupling agent | 2.5 |

*Premix ingredients

This formulation was mixed on an open mill mixer in the same manner as the top stock formulation of Example 1, with the premix ingredients being blended separately and added to the other ingredients in the open mill mixer. The formulation was tested for hardness under P&J testing conditions and found to have a P&J hardness of 20 on a cured, finished roll.

EXAMPLE 6

A top stock formulation was prepared of the ingredient listed in Table 10.

TABLE 10

| Ingredient | Parts (by weight) |
| --- | --- |
| Nitrile Rubber | 70 |
| zinc methacrylate polymer | 30 |
| *1,3 butylene glycol dimethacrylate | 25 |
| *phenol-formaldehyde plasticizer | 7.5 |
| *hydrated Silica reinforcement | 25 |
| *butylphenol/acetylene tackifyer | 2 |
| *octylated diphenylamines antioxidant | 1 |
| *zinc salt of z-mercapto-4(5)-methylbenimidazole antioxidant | 1 |
| *stearic acid activator | 1 |
| *sulfur vulcanizing agent | 0.30 |
| *dicumyl peroxide vulcanizing agent | 7 |
| *zinc oxide activator | 8 |
| *conductive furnace carbon black | 5 |
| *UHMWPE | 40 |
| *Vinyl-tris(2-methoxyethoxy) silane coupling agent | 2.5 |

*Premix ingredients

This formulation was mixed on an open mill mixer in the same manner as the top stock formulation of Example 1, with the premix ingredients being blended separately and added to the other ingredients in the open mill mixer. The formulation was tested for hardness under P&J testing conditions and found to have a P&J hardness of 13 on a cured, finished roll.

EXAMPLE 7

Specimens of top stocks with and without UHMWPE were prepared and tested for abrasion following the abrasive cylinder method discussed in DIN 53 516. See also Comparative wear testing of flooring materials, Wear 162–164 (990–995 1993) for a general description of DIN 53 516. Apparatus used for testing also followed that described in DIN 53 516. Specimens were prepared with and without UHMWPE to determine the effect of including UHMWPE in the formulations. Table 11 tests the general make-up of the specimens and their UHMWPE content.

TABLE 11

| Specimen Type | UHMWPE (parts per 100 parts rubber) |
| --- | --- |
| nitrile-based (28 P&J) Form. 1 | 0 |
| nitrile-based (34 P&J) Form. 1 | 40 |
| nitrile-based (28 P&J) Form. 2 | 0 |
| nitrile-based (28 P&J) Form. 2 | 40 |
| nitrile-based (30 P&J) Form. 3 | 0 |
| nitrile-based (30 P&J) Form. 3 | 40 |
| hypalon-based (29 P&J) Form. 4 | 0 |
| hypalon-based (26 P&J) Form. 4 | 40 |

Figure 3:
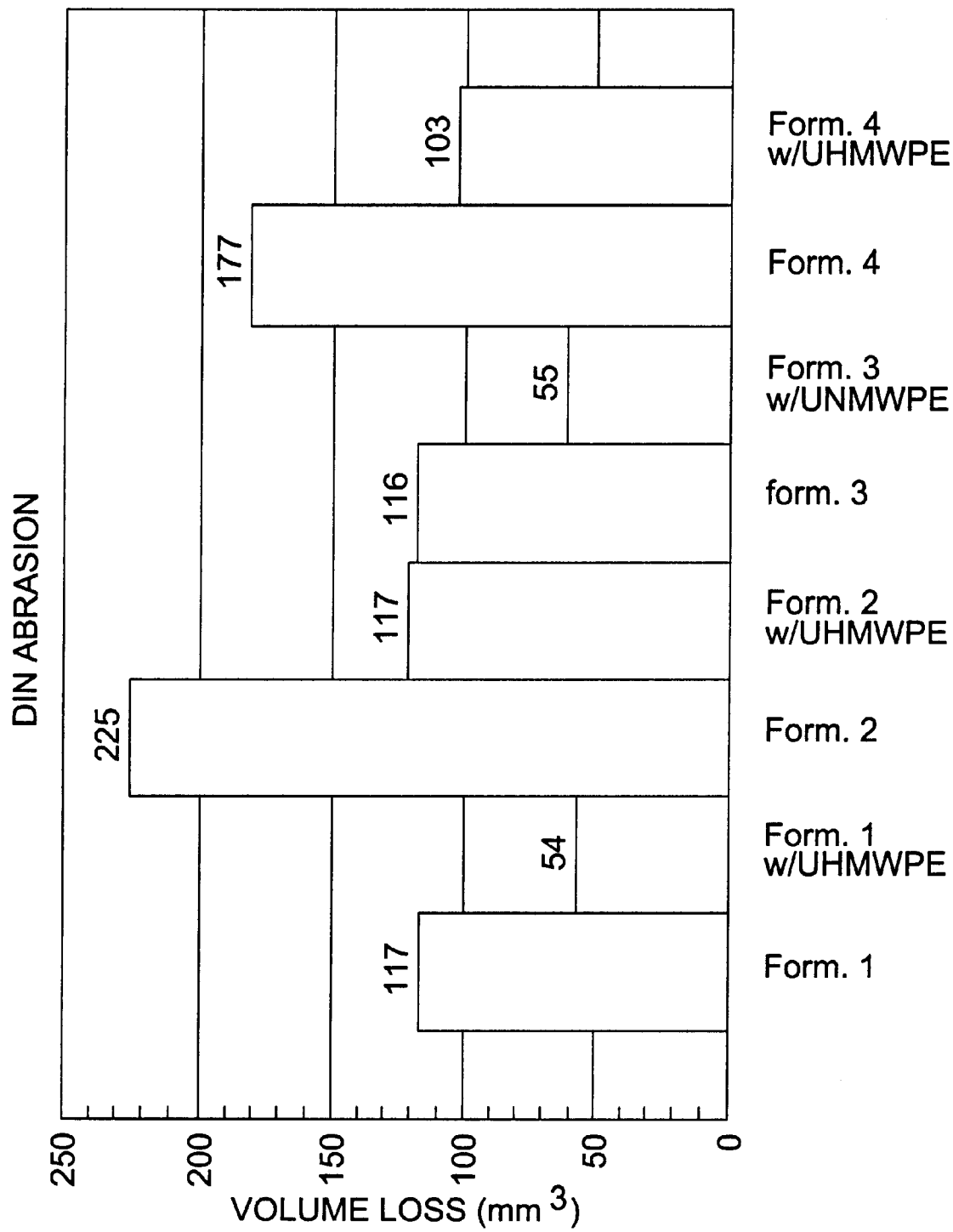
FIG. 3 is a graph illustrating the DIN abrasion resistance for comparative top stock samples with and without UHMWPE.

The results from this testing are shown in FIG. 3. As can be seen therein, the inclusion of UHMWPE in the tested rubber formulations provided a significant decrease in volume loss, which corresponds to a significant increase in abrasion resistance.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein. In the claims, means-plus-function clauses are intended to cover the structures described herein as performing the recited function and not only structural equivalents but also equivalent structures.

That which is claimed is:

1. An industrial roll, comprising:
   a substantially cylindrical core;
   an adhesive layer overlying said core; and
   a cover overlying said adhesive layer, said cover comprising:
      a polymeric base layer overlying said adhesive layer;
      an elastomeric tie-in layer overlying said base layer and underlying said top stock layer, said tie-in layer including an elastomeric material; and
      a top stock layer overlying said base layer, said top stock layer comprising a mixture of an elastomeric material and ultra high molecular weight polyethylene (UHMWPE), said mixture including 100 parts elastomeric material by weight and between about 25 and 50 parts UHMWPE by weight.

2. The industrial roll defined in claim 1, wherein said top stock layer further comprises at least one of the group consisting of: accelerating agents; heat stabilizing agents; curing agents; plasticizing agents; anti-oxidants; activating agents; and anti-ozonants.

3. The industrial roll defined in claim 1, wherein said elastomeric material of said top stock layer is selected from the group consisting of: nitrile rubber; chlorosulfonated polyethylene; styrene butadiene; EPDM; silicone rubber; neoprene; fluoroelastomers; and natural rubber.

4. The industrial roll defined in claim 1, wherein said mixture includes between about 35 and 45 parts UHMWPE by weight.

5. The industrial roll defined in claim 1, wherein said base layer includes a polymer selected from the group consisting of: epoxy, natural rubber, neoprene, styrene-butadiene rubber, neoprene, and nitrile rubber.

6. The industrial roll defined in claim 1, wherein said adhesive layer is selected from the group consisting of: water-based adhesives and solvent-based adhesives.

7. The industrial roll defined in claim 1, wherein top stock has a tensile strength of between about 600 and 4,000 psi and a rubber modulus of between about 300 and 2,000 psi at 50 percent elongation.

8. The industrial roll defined in claim 1, wherein said cover has a P & J surface hardness of between about 5 and 75.

9. An industrial roll, comprising:
   a substantially cylindrical core;
   an adhesive layer overlying said core; and
   a cover overlying said adhesive layer, said cover comprising:
      a polymeric base layer overlying said adhesive layer;
      a tie-in layer overlying said base layer; and
      a top stock layer overlying said tie-in layer, said top stock layer comprising a mixture of an elastomeric material and ultra high molecular weight polyethylene (UHMWPE), said mixture including 100 parts elastomeric material by weight and between about 25 and 50 parts UHMWPE by weight.

10. The industrial roll defined in claim 9, wherein said top stock layer further comprises at least one of the group consisting of: accelerating agents; heat stabilizing agents; curing agents; plasticizing agents; anti-oxidants; activating agents; and anti-ozonants.

11. The industrial roll defined in claim 9, wherein said elastomeric material of said top stock layer is selected from the group consisting of: nitrile rubber; chlorosulfonated polyethylene; styrene butadiene; EPDM; silicone rubber; neoprene; fluoroelastomers; and natural rubber.

12. The industrial roll defined in claim 9, wherein said mixture includes between about 35 and 45 parts UHMWPE by weight.

13. The industrial roll defined in claim 9, wherein said base layer includes a polymer selected from the group consisting of: epoxy, natural rubber, neoprene, styrene-butadiene rubber, neoprene, and nitrile rubber.

14. The industrial roll defined in claim 9, wherein said adhesive layer is selected from the group consisting of: water-based adhesives and solvent-based adhesives.

15. The industrial roll defined in claim 9, wherein said tie-in layer includes a polymer selected from the group consisting of: natural rubber, neoprene, styrene-butadiene rubber, neoprene, and nitrile rubber.

16. The industrial roll defined in claim 9, wherein top stock has a tensile strength of between about 600 and 4,000 psi and a rubber modulus of between about 300 and 2,000 psi at 50 percent elongation.

17. The industrial roll defined in claim 9, wherein said cover has a P & J surface hardness of between about 5 and 75.

18. An industrial roll, comprising:
   a substantially cylindrical core;
   an adhesive layer overlying said core; and
   a cover overlying said adhesive layer, said cover comprising:
      a polymeric base layer overlying said adhesive layer;
      a tie-in layer overlying said base layer; and
      a top stock layer overlying said tie-in layer, said top stock layer comprising a mixture of an elastomeric material and ultra high molecular weight polyethylene (UHMWPE), said mixture including 100 parts elastomeric material by weight and between about 35 and 45 parts UHMWPE by weight.

19. The industrial roll defined in claim 18, wherein said top stock layer further comprises at least one of the group consisting of: accelerating agents; heat stabilizing agents; vulcanizing agents; plasticizing agents; anti-oxidants; activating agents; and anti-ozonants.

20. The industrial roll defined in claim 18, wherein said elastomeric material of said top stock layer is selected from the group consisting of: nitrile rubber; chlorosulfonated polyethylene; styrene butadiene; EPDM; silicone rubber; neoprene; fluoroelastomers; and natural rubber.

21. The industrial roll defined in claim 18, wherein said base layer includes a polymer selected from the group consisting of: natural rubber, neoprene, styrene-butadiene rubber, neoprene, and nitrile rubber.

22. The industrial roll defined in claim 18, wherein said adhesive layer is selected from the group consisting of: water-based adhesives and solvent-based adhesives.

23. The industrial roll defined in claim 18, wherein said tie-in layer includes a polymer selected from the group consisting of: natural rubber, neoprene, styrene-butadiene rubber, neoprene, and nitrile rubber.

24. The industrial roll defined in claim 18, wherein top stock has a tensile strength of between about 600 and 4,000 psi and a rubber modulus of between about 300 and 2,000 psi at 50 percent elongation.

25. The industrial roll defined in claim 18, wherein said cover has a P & J surface hardness of between about 5 and 75.

* * * * *